United States Patent
Rajkumar et al.

(10) Patent No.: US 7,317,707 B2
(45) Date of Patent: Jan. 8, 2008

(54) METHOD FOR SEAMLESS SESSION TRANSFER OF A MOBILE STATION

(75) Inventors: Ajay Rajkumar, Morristown, NJ (US); Michael D. Turner, Madison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 251 days.

(21) Appl. No.: 11/142,312

(22) Filed: Jun. 2, 2005

(65) Prior Publication Data

US 2006/0274694 A1  Dec. 7, 2006

(51) Int. Cl.
*H04Q 7/00* (2006.01)

(52) U.S. Cl. .................. 370/331; 370/328; 370/338; 455/442

(58) Field of Classification Search ............. 370/331, 370/310.1, 328, 338, 359; 455/442
See application file for complete search history.

(56) References Cited

U.S. PATENT DOCUMENTS

| 6,507,572 | B1 * | 1/2003 | Kumar et al. | 370/335 |
| 6,657,981 | B1 * | 12/2003 | Lee et al. | 370/331 |
| 6,928,304 | B2 * | 8/2005 | Wigell et al. | 455/561 |
| 7,065,362 | B2 * | 6/2006 | Lee et al. | 455/442 |
| 2003/0086427 | A1 * | 5/2003 | Lee et al. | 370/394 |
| 2004/0081119 | A1 * | 4/2004 | Zhong et al. | 370/328 |
| 2004/0184424 | A1 * | 9/2004 | Shibata et al. | 370/331 |
| 2005/0073988 | A1 * | 4/2005 | Kroth et al. | 370/349 |

FOREIGN PATENT DOCUMENTS

| EP | 0777396 | * | 6/1997 |
| EP | 1059823 | | 12/2000 |
| EP | 1519519 | | 3/2005 |
| WO | WO01/20938 | | 3/2001 |

OTHER PUBLICATIONS

Seamless handoff in community and location Aware Heterogeneous Wireless Network;Maximilian Zundt; Oct. 5, 2003.*
International Search Report (Forms PCT/ISA/220 and PCT/ISA/210) mail date Oct. 4, 2006 and Written Opinion Of The International Searching Authority (Form PCT/OSA/237).

* cited by examiner

*Primary Examiner*—Sanh Phu

(57) ABSTRACT

In the method, a source base station sends first information to a target base station. The first information indicates a sequence number of a first data unit in a sequence of data units undelivered to the mobile station by the source base station. The source base station also sends the target base station second information. The second information indicates data units, after the first undelivered data unit in the sequence, that have been delivered to the mobile station by the source base station. The second information may further indicate portions of the first undelivered data unit that have been delivered to the mobile station by the source base station.

18 Claims, 2 Drawing Sheets

METHOD FOR SEAMLESS SESSION TRANSFER OF A MOBILE STATION

BACKGROUND OF THE INVENTION

As a mobile station or mobile subscriber station (e.g., a handset, a wireless equipped computer, a wireless equipped PDA, etc.) moves from one wireless network to another, the serving or source wireless network hands off serving the communication needs of the mobile station to the new or target network. Preferably, the handoff technique results in a transfer from the source to the target network that is seamless to the mobile station. However, providing a seamless transfer for a mobile station involved in a data session may provide added challenges.

For example, a mobile user may be running an application on the mobile station that depends on being provided with data in real-time. An interruption (even a slight interruption) in the handling of the communication needs of the mobile station will be readily apparent to the mobile user. Accordingly, providing seamless transfer of a data session during handoff of a mobile station from a source network to a target network is one of the ongoing challenges in the development and evolution of numerous wireless communication standards. For instance, this problem is currently a subject in the development of the 802.16e standard.

SUMMARY OF THE INVENTION

The present invention relates to seamless session transfer of mobile wireless communication.

In one embodiment, first information is sent to a target base station. The first information indicates a sequence number of a first data unit in a sequence of data units undelivered to the mobile station by the source base station. The source base station also sends the target base station second information. The second information indicates data units, after the first undelivered data unit in the sequence, that have been delivered to the mobile station by the source base station.

In one embodiment, the second information may further indicate portions of the first undelivered data unit that have been delivered to the mobile station by the source base station.

In yet another embodiment, the second information may indicate a protocol used by the source base station to form the data units into transmission units for transmission to the mobile station.

In another embodiment, the method also includes sending data units to the target base station beginning with the first undelivered data unit.

In an embodiment of the method, data of a first granularity is sent to a target base station. The source base station sends information to the target base station that indicates data not successfully delivered to the mobile station by the source base station at a second granularity. The second granularity may be different from the first granularity. For example, the second granularity may be greater than or less than the first granularity.

In one embodiment, the second granularity may be the same as the granularity with which a base station of the source base station transfers data to the mobile station over the air. Accordingly, the second granularity may be of variable size and depend on the method of forming data of the second granularity, or the second granularity may be of fixed size—perhaps, also dependent on the method of forming data of the second granularity. As another example, the second granularity may be a known fixed quantity such as a byte.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

The present invention provides for seamless session transfer of a mobile station as the mobile station moves from a source wireless network to a target wireless network. For the purposes of explanation only, the embodiments of the present invention will be described as being implemented on WiMax or 802.16e architecture. Accordingly, two possible WiMax reference architectures will first be described with reference to FIGS. 1 and 2. Then, a first and a second example embodiment of the present invention will be described with reference to FIGS. 1 and 2.

Figure 1:
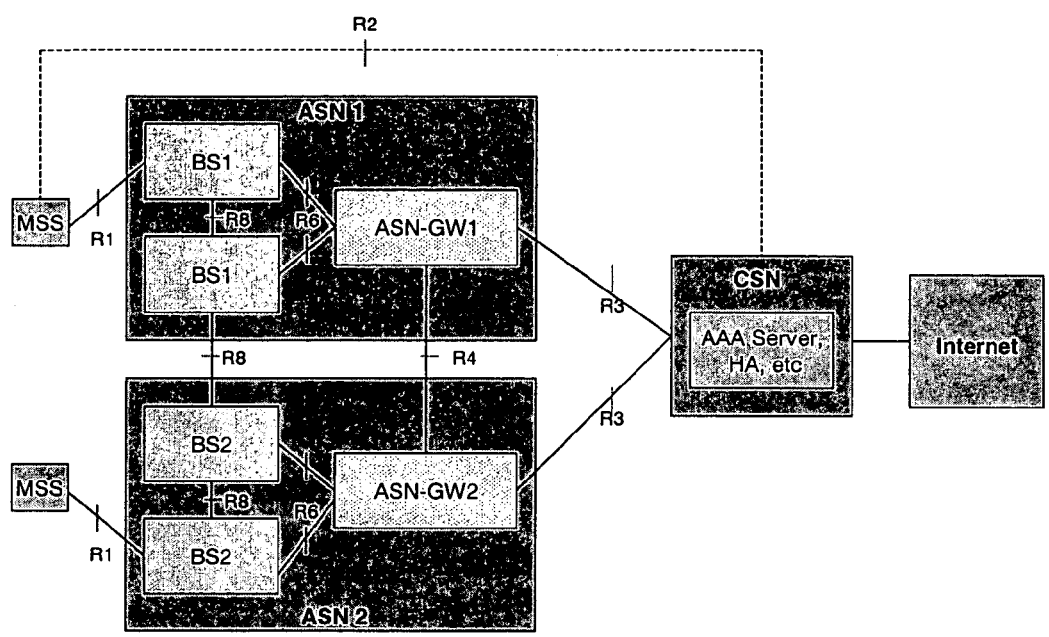
FIG. 1 illustrates an example centralized wireless network architecture.

FIG. 1 illustrates an example of a centralized architecture of a WiMax or 802.16e system. As shown, a connectivity service network or CSN communicates with (transfers data to and receives data from) a data network such as the Internet. The CSN communicates with one or more access service networks (or ASNs) such as ASN1 and ASN2 illustrated in FIG. 1. Each access service network ASN includes a single ASN—gateway or ASN-GW communicating with the CSN over an interface—an R3 interface in this example. The ASN-GW communicates with several base stations or BSs over respective interfaces—R6 interfaces in this example. Each base station serves the communication needs of mobile stations or mobile subscriber stations (MSSs) within its coverage area.

As shown, the BSs communicate with the mobile stations over an air-interface governed by, for example, an R1 protocol or R1 interface. Furthermore, base stations in the different ASNs may directly communicate with one another over respective interfaces—R8 interfaces in this example, and the ASN-GWs in the different ASNs may communicate with one another over respective interfaces—R4 interfaces in this example.

In operation, the CSN may operate as the home agent (HA) and may also provide the authentication, authorization and accounting functions well-known in the art. As shown, the CSN may also communicate with the mobile station via an R2 interface. The ASN-GW may operate as the gateway for routing data to the respective base stations among other things, and the base stations handle the communication needs of the mobile stations.

Figure 2:
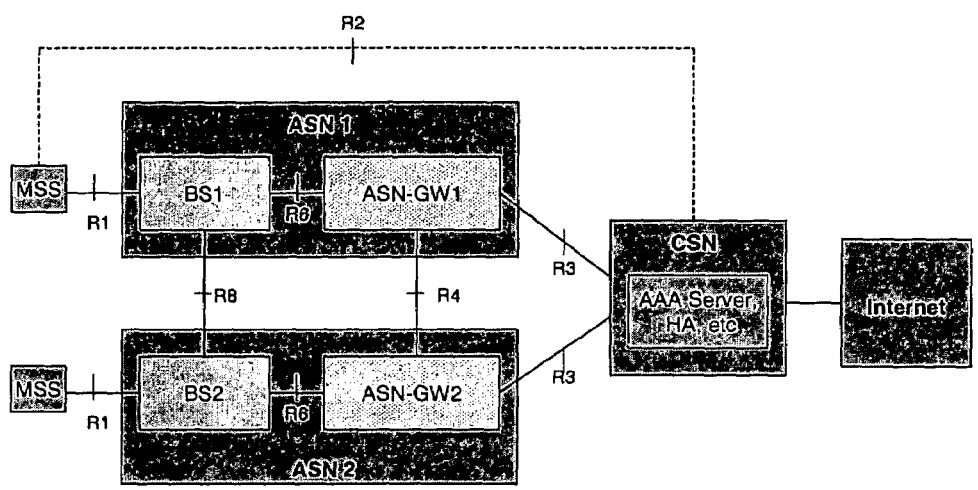
FIG. 2 illustrates an example distributed wireless network architecture.

FIG. 2 illustrates an example of a distributed architecture of a WiMax or 802.16e system. The architecture of FIG. 2 is similar to the architecture of FIG. 1, except that a one-to-one relationship exists between a BS and an ASN-GW. Namely, each ASN includes one BS and ASN-GW pair.

With respect to both the architectures of FIGS. 1 and 2, the BS and ASN-GW may be separate devices in separate locations, or the BS and ASN-GW may be in the same location, or the BS and ASN-GW may be implemented as a single device.

FIRST EXAMPLE EMBODIMENT

Next, the method for seamless session transfer according to an embodiment of the present invention will be described with reference to FIGS. 1 and 2. Initially, the CSN communicates data with (sends data to and receives data from) the ASN currently serving the communication needs of a MSS. More specifically, the CSN communicates data with the ASN-GW of the ASN, and the ASN-GW communicates the data with the base station serving the communication needs of the mobile station. The communication of data between the Internet and the mobile station is referred to as a session.

The CSN and ASN-GW communicate data in units, referred to hereinafter as ASN units. The ASN units have a first granularity or size. As an example, an ASN unit may be an IP data packet. The ASN-GW may assign a number to each ASN unit received. The numbers may be assigned sequentially, and are referred to as sequence numbers. Alternatively, the ASN units may include an embedded sequence number—in which case the ASN unit itself indicates the sequence number.

The ASN-GW communicates the ASN units to the base station. The BS forms the ASN units into units hereinafter called BS units for transmission to the mobile station. For example, the ASN units may be IP packets and the BS units may be packet data units (PDUs).

The BS units have a second granularity or size, which may be the same as or different than the first granularity. In an embodiment where the BS units are the same size as the ASN units, the ASN units may be directly used as BS units—as opposed to undergoing some formation process. In one embodiment, a BS unit is smaller than an ASN unit such that an ASN unit is divided into more than one BS unit. In another embodiment, a BS unit is larger than an ASN unit such that a BS unit includes portions of at least two ASN units. For instance, the BS unit may include the last portion of or an entire ASN unit, and a beginning portion of a next ASN unit.

The BS units may also be of fixed or variable size. For example, when of fixed sized, the BS units may be padded to meet the fixed sized. However, this does not necessarily make the best use of the limited air interface communication channels. Consequently, numerous standards provide for forming BS units of variable length.

Because the present invention involves transfer of the mobile station from the serving network to another network, the serving ASN will be referred to as the source ASN, and the network elements of the ASN; namely, the base station and the ASN-GW, will be referred to as the source base station or S-BS and source ASN-gateway or S-ASN-GW, respectively. Similarly, the ASN to which the mobile station MSS is being transferred will be referred to as the target ASN, and the network elements of the target ASN; namely the BS and the ASN-GW will be referred to as the target base station or T-BS and the target ASN-gateway or T-ASN-GW.

During the handoff of the mobile station, the communication needs of the mobile station are transferred from the source ASN to the target ASN, and more particularly, from the S-BS to the T-BS. The messaging, etc. for conducting the handoff are well-known and set forth in numerous wireless communication protocols. For the sake of clarity, this signaling will not be described in detail. Instead, the signaling for conducting this embodiment of the present invention will be described in detail.

Using the sequence numbers of the ASN units received from the S-ASN-GW, the S-BS tracks the ASN units delivered (i.e., sent and acknowledged) and not delivered (i.e., not sent or sent, but not acknowledged) to the MSS. When the handoff procedure begins, the S-BS communicates the sequence number of a first undelivered ASN unit to the S-ASN-GW as part of a handoff (HO) data migration message, which indicates that the mobile station is being transferred. The first undelivered ASN unit is an ASN unit with the earliest sequence number that has not been completely delivered to the MSS. When the BS units are not the same granularity as the ASN units, portions of, but not all of, the first undelivered ASN unit may have been delivered to the MSS. The S-ASN-GW sends the sequence number of the first undelivered ASN unit to the T-ASN-GW in a handoff start sequence message, which indicates that the T-ASN-GW should begin ASN unit sequence numbering with the sequence number in the handoff start sequence message. Alternatively, the sequence number of the ASN unit just prior to the first undelivered ASN unit that has been delivered may be sent in the handoff start sequence message. Here, the T-ASN-GW will begin assigning sequence numbers starting from an increment of the received sequence number. The T-ASN-GW may also provide this sequence number to the T-BS.

The S-BS also communicates medium access control (MAC) state information to the T-BS. This information includes granularity information, an indication of the portion of the first undelivered ASN unit that may have been successfully delivered, and an indication of ASN units having a later sequence number than the first undelivered ASN unit that have been delivered to the mobile station MSS. As is known in the art, even if ASN units are sequentially sent to the mobile station, the mobile station does not necessarily receive these ASN units in sequence. Consequently, an ASN unit later than the first undelivered ASN unit may have been delivered to the MSS.

The granularity information indicates the granularity of the BS units (i.e., the second granularity), and may also indicate the methodology or protocol for forming the BS units. Indicating the methodology or protocol for forming the BS units is particularly useful when the BS units may be variable in length.

When the ASN units have a larger granularity than the BS units, the portion or portions of the first undelivered ASN unit that has been successfully delivered may be indicated by identifying the BS units of the first undelivered ASN unit that have been delivered. Alternatively, this indication may be provided by identifying the BS units of the first undelivered ASN unit that have not been successfully delivered. As a further alternative, the S-BS may indicate the portion of the ASN unit delivered or undelivered using a known fixed, amount such as a byte or bit. In this situation, the MAC state information may not include the granularity information. In yet another embodiment, instead of communicating an indication of the portion of the first undelivered ASN unit delivered or undelivered, the undelivered portion of the first undelivered ASN unit may be sent by the S-BS to the T-BS. In this situation, the MAC state information may not include the granularity information.

The communication of this information may be directly over the R8 interface. Alternatively, this information may be communicated via the S-ASN-GW, the R4 interface, and the T-ASN-GW to the T-BS.

As the handoff procedure ends and the T-BS is to take over serving the communication needs of the mobile station, the ASN unit communication from the CSN to the S-ASN-GW, beginning with the first undelivered ASN unit, is tunneled to the T-ASN-GW from the S-ASN-GW. The T-ASN-GW then sends the tunneled ASN units to the T-BS. The T-ASN-GW will continue the sequence numbering using the sequence number for the first undelivered ASN unit received from the S-ASN-GW. The T-BS, based on the information received from the S-BS and the sequence number from the T-ASN-GW, forms the ASN unit(s) into the BS units and sends the portion of the first undelivered ASN unit that has not been successfully delivered to the MSS. Also, using the received information, the T-BS will not send ASN units with sequence numbers later than the first undelivered ASN unit that have already been delivered. Eventually the stream of ASN units from the CSN are directly sent to the T-ASN-GW.

SECOND EXAMPLE EMBODIMENT

As with the first example embodiment, in this second example embodiment, initially, the CSN communicates data with (sends data to and receives data from) the ASN currently serving the communication needs of a MSS, and the mobile station enters into a handoff procedure whereby the communication needs of the mobile station will be transferred from the S-BS to the T-BS. For the sake of clarity, this handoff signaling will not be described in detail. Instead, the signaling for conducting this embodiment of the present invention will be described.

As with the first example embodiment, in this embodiment, the S-BS tracks the ASN units delivered and not delivered to the MSS using the sequence numbers of the ASN units received from the ASN-GW. When the handoff procedure begins, the S-BS communicates the sequence number of a last-in-sequence delivered ASN unit to the S-ASN-GW in a handoff pre-migration message, which indicates that a handoff is to take place. The last-in-sequence delivered ASN unit has the latest sequence number of the delivered ASN units for which there does not exist an undelivered ASN unit with an earlier sequence number. Stated another way, the last-in-sequence delivered ASN unit is the ASN unit just before the first undelivered ASN unit in the sequence of ASN units. Alternatively, the S-ASN-GW may send the sequence number of the first undelivered ASN unit to the T-ASN-GW.

Unlike the first example embodiment in which communication of data through the S-BS ends before tunneling data to the T-ASN-GW from the S-ASN-GW, in this embodiment data continues to be sent from the S-BS to the mobile station and this data is tunneled to the T-ASN-GW from the S-ASN-GW. Accordingly, after sending a handoff start sequence message from the S-ASN-GW to the T-ASN-GW as discussed in the first example embodiment, or together with sending this message, the undelivered ASN units are tunneled from the T-ASN-GW to the T-BS. The T-ASN-GW continues the sequence numbering for the ASN units using the sequence number received from the S-ASN-GW, as discussed in the first example embodiment. This sequence number may also be sent to the T-BS from the T-ASN-GW. Alternatively, the ASN units may include an embedded sequence number—in which case the ASN unit itself indicates the sequence number of the ASN unit.

When the handoff procedure is going to complete, the S-BS notifies the S-ASN-GW to stop sending data to the S-BS in a handoff data migration message. The S-BS also communicates a handoff data migration message and MAC state information to the T-BS. The handoff migration message indicates that the handoff is being completed. The MAC state information is the same (including the stated alternatives) as described above in the first example embodiment. The communication of this information may be directly over the R8 interface. Alternatively, this information may be communicated via the S-ASN-GW, the R4 interface, and the T-ASN-GW to the T-BS.

Data continues to be tunneled from the S-ASN-GW to the T-ASN-GW after the handoff procedure ends, and eventually the stream of ASN units from the CSN are directly sent to the T-ASN-GW.

THIRD EXAMPLE EMBODIMENT

With respect to the embodiments described above, these embodiments and the method of the present invention may also be applied to the centralized architecture of FIG. 1 for in-network transfer of the mobile station. In an in-network transfer, the mobile station is transfer from a S-BS within and ASN to a T-BS within the same ASN. Accordingly, the S-ASN-GW to T-ASN-GW communication discussed in the above described embodiments does not take place because the S-ASN-GW and the T-ASN-GW are one and the same. However, communication from the S-BS to ASN-GW, from the ASN-GW to the T-BS, or from the S-BS to the T-BS still takes place as described above. Accordingly, the present invention also provides for seamless in-network transfer in a centralized architecture.

While the embodiments of the present invention have been described as implemented on WiMax or 802.16e architectures, the present invention is not limited to implementation on these architectures or this wireless communication standard.

The invention being thus described, it will be obvious that the same may be varied in many ways. Such variations are not to be regarded as a departure from the invention, and all such modifications are intended to be included within the scope of the invention.

We claim:

1. A method for transferring a mobile station from a source base station to a target base station, comprising:
   sending first information indicating a sequence number of a first data unit in a sequence of data units undelivered to the mobile station by the source base station; and
   sending second information indicating data units after the first undelivered data unit in the sequence that have been delivered to the mobile station by the source base station.

2. The method of claim 1, wherein the second information further indicates portions of the first undelivered data unit that have been delivered to the mobile station by the source base station.

3. The method of claim 2, wherein the second information identifies undelivered portions of the first undelivered data unit to indicate portions of the first undelivered data unit that have been delivered.

4. The method of claim 2, wherein the second information includes undelivered portions of the first undelivered data unit to indicate portions of the first undelivered data unit that have been delivered.

5. The method of claim 2, wherein the second information indicates a protocol used by the source base station to form the data units into transmission units for transmission to the mobile station.

6. The method of claim 1, wherein the first information includes the sequence number of the first undelivered data unit to indicate the sequence number of the first undelivered data unit in the sequence of data units.

7. The method of claim 1, wherein the first information includes a sequence number of a delivered data unit to indicate the sequence number of the first undelivered data unit in the sequence of data units.

8. The method of claim 1, further comprising:
sending data units from the source base station beginning with the first undelivered data unit.

9. The method of claim 1, wherein
the sending first information step is performed by a network gateway of a source network; and
the sending second information step is performed by the source base station of the source network.

10. A method for transferring a mobile station from a source base station to a target base station, comprising:
receiving first information indicating a sequence number of a first data unit in a sequence of data units undelivered to the mobile station by the source base station; and
receiving second information indicating data units after the first undelivered data unit in the sequence that have been delivered to the mobile station by the source base station.

11. The method of claim 10, wherein the second information further indicates portions of the first undelivered data unit that have been delivered to the mobile station by the source base station.

12. The method of claim 11, further comprising:
transmitting data to the mobile station beginning with the undelivered portions of the first undelivered data unit.

13. A method of transferring a mobile station from a source base station to a target base station, comprising:
sending data of a first granularity to the target base station; and
sending information from the source base station indicating data undelivered to the mobile station by the source base station at a second granularity, the second granularity being different from the first granularity.

14. The method of claim 13, wherein the information indicates a protocol for creating data of the second granularity.

15. The method of claim 14, wherein the information indicates the second granularity.

16. The method of claim 13, wherein the information indicates the data undelivered to the mobile station by the source base station at a second granularity by indicating the data of the second granularity forming one of the data of the first granularity that have been delivered by the source base station to the mobile station.

17. The method of claim 10, wherein the information includes the second granularity data undelivered to the mobile station by the source base station.

18. A method of transferring a mobile station from a source base station to a target base station, comprising:
receiving data of a first granularity from the source base station; and
receiving information from the source base station indicating data undelivered to the mobile station by the source base station at a second granularity, the second granularity being different from the first granularity.

* * * * *